United States Patent
Han et al.

(10) Patent No.: US 11,012,973 B2
(45) Date of Patent: May 18, 2021

(54) METHOD FOR RECEIVING, BY USER EQUIPMENT, PAGING SIGNAL IN WIRELESS COMMUNICATION SYSTEM AND DEVICE FOR PERFORMING THE METHOD

(71) Applicant: LG Electronics Inc., Seoul (KR)

(72) Inventors: Sangwook Han, Seoul (KR); Taehun Kim, Seoul (KR); Jaewook Lee, Seoul (KR); Gwanmo Ku, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/323,587

(22) PCT Filed: Jan. 3, 2018

(86) PCT No.: PCT/KR2018/000078
§ 371 (c)(1),
(2) Date: Feb. 6, 2019

(87) PCT Pub. No.: WO2019/135418
PCT Pub. Date: Jul. 11, 2019

(65) Prior Publication Data
US 2021/0068072 A1 Mar. 4, 2021

(51) Int. Cl.
*H04W 4/00* (2018.01)
*H04W 68/02* (2009.01)
*H04W 76/27* (2018.01)
*H04W 8/02* (2009.01)

(52) U.S. Cl.
CPC ............ *H04W 68/02* (2013.01); *H04W 8/02* (2013.01); *H04W 76/27* (2018.02)

(58) Field of Classification Search
CPC ... H04W 68/00; H04W 68/005; H04W 68/02; H04W 68/025; H04W 76/20; H04W 76/27; H04W 84/022; H04W 84/027; H04W 88/185
See application file for complete search history.

(56) References Cited

U.S. PATENT DOCUMENTS

| 2013/0208699 | A1* | 8/2013 | Hakkinen | H04W 76/38 370/331 |
| 2014/0051466 | A1* | 2/2014 | Yu | H04W 8/06 455/466 |
| 2014/0293769 | A1 | 10/2014 | Chen et al. | |

FOREIGN PATENT DOCUMENTS

WO 2016056839 A1 4/2016

OTHER PUBLICATIONS

Catt, "Procedure of paging in inactive", 3GPP TSG-RAN WG2 #100, Nov. 27-Dec. 1, 2017, R2-1712422.

(Continued)

*Primary Examiner* — Matthew W Genack
(74) *Attorney, Agent, or Firm* — Dentons US LLP (57) ABSTRACT

The present disclosure provides a method for receiving a paging message, by a user equipment (UE) in a radio resource control (RRC) connection suspended state, in a wireless communication system. The method includes receiving the paging message from an evolved Node B (eNB); checking an indicator indicating whether the eNB stores a UE context, wherein the indicator is included in the paging message; and transmitting an RRC connection-resume request message or an RRC connection request message to the eNB based on the indicator.

4 Claims, 11 Drawing Sheets

(56) References Cited

OTHER PUBLICATIONS

Ericsson, "Paging in RRC_INACTIVE", 3GPP TSG-RAN WG2 #100, Nov. 27-Dec. 1, 2017, R2-1712520.
LG Electronics Inc., "CN-initiated paging for a UE in RRC_INACTIVE", 3GPP TSG-RAN2 #100, Nov. 27-Dec. 1, 2017, R2-1713618.

* cited by examiner

(a) Control-plane protocol stack (b) User-plane protocol stack

FIG. 11

METHOD FOR RECEIVING, BY USER EQUIPMENT, PAGING SIGNAL IN WIRELESS COMMUNICATION SYSTEM AND DEVICE FOR PERFORMING THE METHOD

TECHNICAL FIELD

The present disclosure relates to a wireless communication system, and more particularly, to a method for receiving, by an user equipment, a paging signal in a wireless communication system, and to a device for performing the method.

BACKGROUND

As an example of a mobile communication system to which the present disclosure is applicable, a 3rd Generation Partnership Project Long Term Evolution (hereinafter, referred to as LTE) communication system is described in brief.

Figure 1:
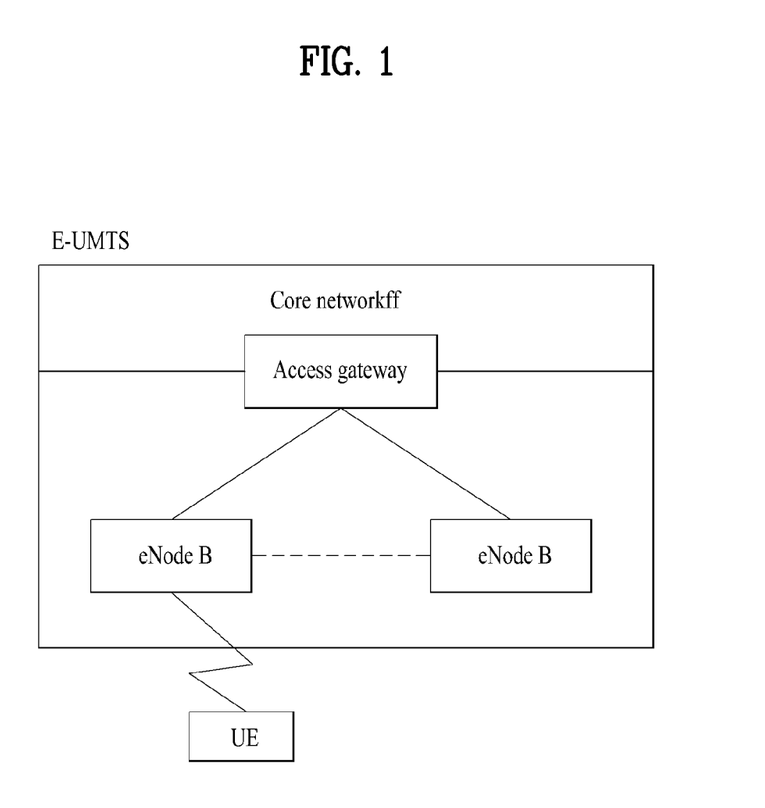
FIG. 1 is a diagram showing a network structure of an Evolved Universal Mobile Telecommunications System (E-UMTS) as an example of a wireless communication system.

FIG. 1 is a view schematically illustrating a network structure of an E-UMTS as an exemplary radio communication system. An Evolved Universal Mobile Telecommunications System (E-UMTS) is an advanced version of a conventional Universal Mobile Telecommunications System (UMTS) and basic standardization thereof is currently underway in the 3GPP. E-UMTS may be generally referred to as a Long Term Evolution (LTE) system. For details of the technical specifications of the UMTS and E-UMTS, reference can be made to Release 7 and Release 8 of "3rd Generation Partnership Project; Technical Specification Group Radio Access Network".

Referring to FIG. 1, the E-UMTS includes a User Equipment (UE), eNode Bs (eNBs), and an Access Gateway (AG) which is located at an end of the network (E-UTRAN) and connected to an external network. The eNBs may simultaneously transmit multiple data streams for a broadcast service, a multicast service, and/or a unicast service.

One or more cells are present per eNB. A cell is configured to use one of bandwidths of 1.44, 3, 5, 10, 15, and 20 MHz to provide a downlink or uplink transport service to several UEs. Different cells may be set to provide different bandwidths. The eNB controls data transmission and reception for a plurality of UEs. The eNB transmits downlink scheduling information with respect to downlink data to notify a corresponding UE of a time/frequency domain in which data is to be transmitted, coding, data size, and Hybrid Automatic Repeat and reQuest (HARQ)-related information. In addition, the eNB transmits uplink scheduling information with respect to uplink data to a corresponding UE to inform the UE of an available time/frequency domain, coding, data size, and HARQ-related information. An interface may be used to transmit user traffic or control traffic between eNBs. A Core Network (CN) may include the AG, a network node for user registration of the UE, and the like. The AG manages mobility of a UE on a Tracking Area (TA) basis, each TA including a plurality of cells.

Although radio communication technology has been developed up to LTE based on Wideband Code Division Multiple Access (WCDMA), demands and expectations of users and providers continue to increase. In addition, since other radio access technologies continue to be developed, new advances in technology are required to secure future competitiveness. For example, decrease of cost per bit, increase of service availability, flexible use of a frequency band, simple structure, open interface, and suitable power consumption by a UE are required.

DISCLOSURE

Technical Purpose

A technical purpose of the present disclosure is to provide a method for receiving, by an user equipment, a paging signal in a wireless communication system, and to a device for performing the method.

Technical Solution

In one aspect, there is provided a method for receiving a paging message, by a user equipment (UE) in a radio resource control (RRC) connection suspended state, in a wireless communication system, the method comprising: receiving the paging message from an evolved Node B (eNB); checking an indicator indicating whether the eNB stores a UE context, wherein the indicator is included in the paging message; and transmitting an RRC connection-resume request message or an RRC connection request message to the eNB based on the indicator.

In one embodiment, when the indicator indicates that the UE context is stored in the eNB, the RRC connection-resume request message is transmitted to the eNB. In one embodiment, when the indicator indicates that the UE context is not stored in the eNB, the RRC connection request message is transmitted to the eNB. In one embodiment, the method further comprises: when the indicator indicates that the UE context is not stored in the eNB, discarding the UE context stored in the UE.

In one embodiment, the paging message is transmitted from a mobility management entity (MME) to the eNB, wherein the paging message transmitted to the eNB includes information indicating that the paging message is intended for the eNB storing the UE context therein.

In another aspect, there is provided a method for transmitting, by an evolved Node B (eNB), a paging message to a user equipment (UE) in a radio resource control (RRC) connection suspended state, in a wireless communication system, the method comprising: receiving the paging message from a mobility management entity (MME); including, into the paging message, an indicator indicating whether the eNB stores a UE context, and transmitting the paging message to UE; and receiving, from the UE, an RRC connection-resume request message or an RRC connection request message based on the indicator.

In one embodiment, when the indicator indicates that the UE context is stored in the eNB, the RRC connection-resume request message is received from the UE. In one embodiment, when the indicator indicates that the UE context is not stored in the eNB, the RRC connection request message is received to the UE. In one embodiment, when the indicator indicates that the UE context is not stored in the eNB, the UE context stored in the UE is discarded.

In one embodiment, the paging message received from the MME includes information indicating that the paging message is intended for the eNB storing the UE context therein.

Technical Effect

According to the embodiment of the present disclosure, the user equipment in the RRC connection suspended state may prevent an unnecessary RRC connection procedure from being performed by using information contained in the paging signal received from the network.

It will be appreciated by persons skilled in the art that that the effects that can be achieved through the present disclosure are not limited to what has been particularly described hereinabove and other advantages of the present disclosure will be more clearly understood from the following detailed description.

DETAILED DESCRIPTIONS

Hereinafter, structures, operations, and other features of the present disclosure will be readily understood from the embodiments of the present disclosure, examples of which are illustrated in the accompanying drawings. Embodiments described later are examples in which technical features of the present disclosure are applied to a 3GPP system.

Although the embodiments of the present disclosure are described using a long term evolution (LTE) system and a LTE-advanced (LTE-A) system in the present specification, they are purely exemplary. Therefore, the embodiments of the present disclosure are applicable to any other communication system corresponding to the above definition. In addition, although the embodiments of the present disclosure are described based on a frequency division duplex (FDD) scheme in the present specification, the embodiments of the present disclosure may be easily modified and applied to a half-duplex FDD (H-FDD) scheme or a time division duplex (TDD) scheme.

Figure 2:
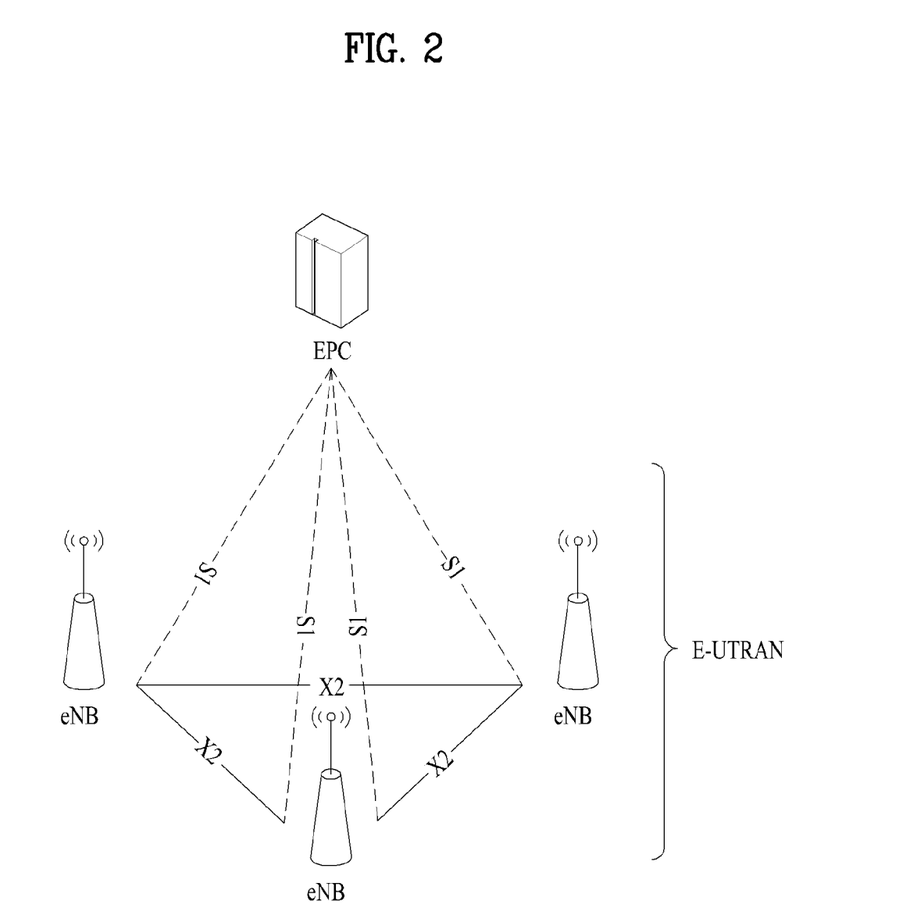
FIG. 2 is a diagram showing the concept of a network structure of an Evolved Universal Terrestrial Radio Access Network (E-UTRAN).

FIG. 2 is a diagram showing the concept of a network structure of an Evolved Universal Terrestrial Radio Access Network (E-UTRAN). In particular, the E-UTRAN system is a system evolved from the existing UTRAN system. The E-UTRAN includes cells (eNBs) and cells are connected via an X2 interface. A cell is connected to a user equipment (UE) via an air interface and is connected to an evolved packet core (EPC) via an S1 interface.

The EPC includes a mobility management entity (MME), a serving-gateway (S-GW) and a packet data network-gateway (PDN-GW). The MME has access information of a UE and information about capabilities of the UE. Such information is mainly used for mobility management of the UE. The S-GW is a gateway having an E-UTRAN as an end point and the PDN-GW is a gateway having a PDN as an end point.

Figure 3:
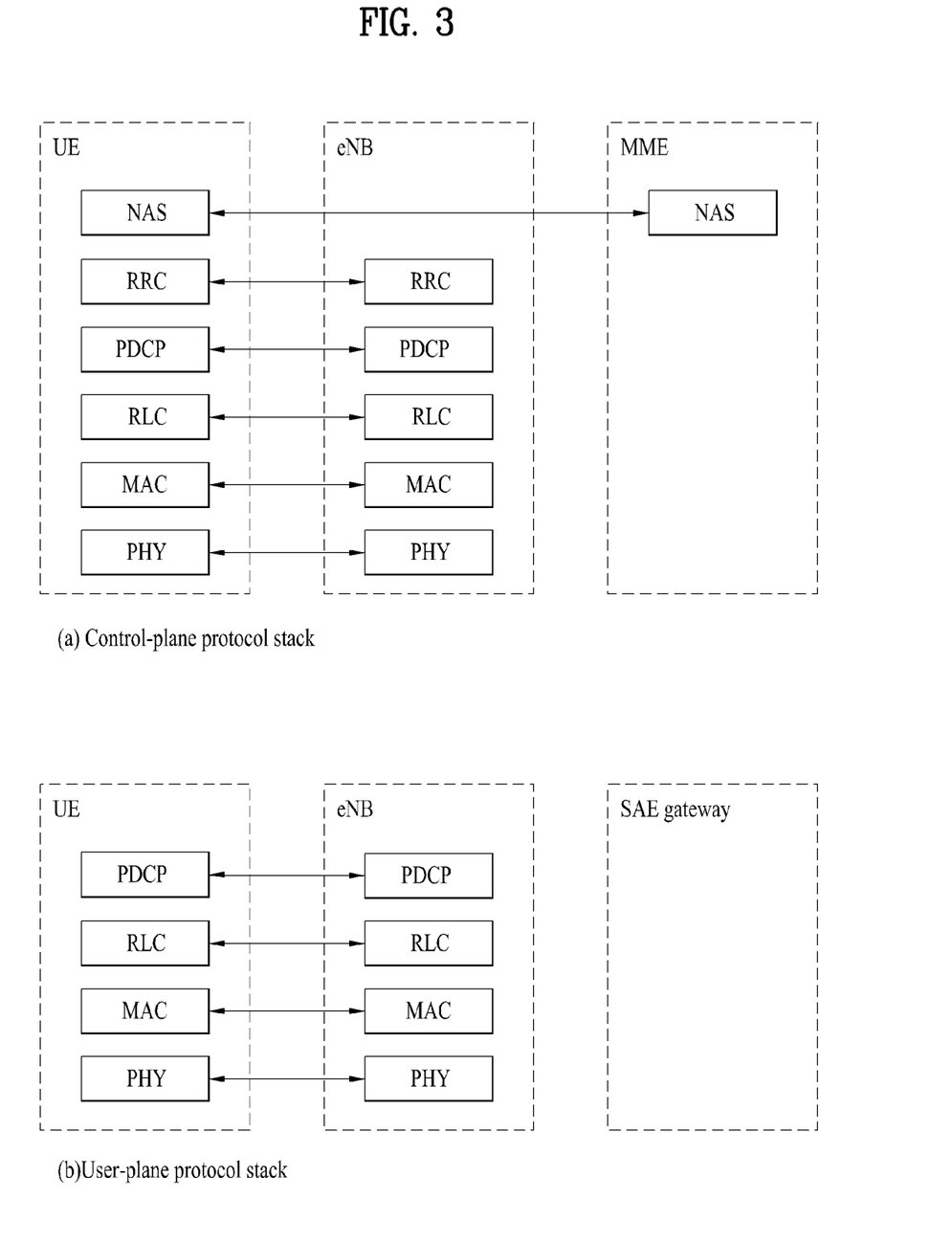
FIG. 3 is a diagram showing a control plane and a user plane of a radio interface protocol between a User Equipment (UE) and an Evolved Universal Terrestrial Radio Access Network (E-UTRAN) based on a 3rd Generation Partnership Project (3GPP) radio access network standard.

FIG. 3 shows a control plane and a user plane of a radio interface protocol between a UE and an Evolved Universal Terrestrial Radio Access Network (E-UTRAN) based on a 3GPP radio access network standard. The control plane refers to a path used for transmitting control messages used for managing a call between the UE and the network. The user plane refers to a path used for transmitting data generated in an application layer, e.g., voice data or Internet packet data.

A physical (PHY) layer of a first layer provides an information transfer service to a higher layer using a physical channel. The PHY layer is connected to a Medium Access Control (MAC) layer located on a higher layer via a transport channel. Data is transported between the MAC layer and the PHY layer via the transport channel. Data is also transported between a physical layer of a transmitting side and a physical layer of a receiving side via a physical channel. The physical channel uses a time and a frequency as radio resources. More specifically, the physical channel is modulated using an Orthogonal Frequency Division Multiple Access (OFDMA) scheme in downlink and is modulated using a Single-Carrier Frequency Division Multiple Access (SC-FDMA) scheme in uplink.

A medium access control (MAC) layer, a radio link control (RLC) layer and a packet data convergence protocol (PDCP) layer may be located in a second layer. The packet data convergence protocol (PDCP) layer of the second layer performs a header compression function for reducing the size of an IP packet header which is relatively great in size and includes unnecessary control information in order to efficiently transmit IP packets, such as IPv4 or IPv6 packets, in a radio interval with a relatively narrow bandwidth. Accordingly, only necessary information need be included in the header part of data for transmission, so as to increase transmission efficiency of a radio interval. In the LTE system, the PDCP layer also performs a security function. The security function includes a ciphering function for preventing data monitoring from a third party, and an integrity protection function for preventing third party data manipulation.

A radio resource control (RRC) layer of the third layer is defined only in the control plane. The RRC layer handles logical channels, transport channels and physical channels for the configuration, re-configuration and release of radio bearers (RBs). Here, a radio bearer (RB) denotes a service provided by the second layer for data transfer between the UE and the network. The RRC layers of the UE and the network exchange RRC messages with each other.

In an LTE system, one cell configuring an eNB is configured to use a bandwidth such as 1.25, 2.5, 5, 10, 15 or 20 MHz to provide a downlink or uplink transmission service to several UEs. Different cells may be configured to provide different bandwidths.

Downlink transport channels for transmission of data from the network to the UE include a Broadcast Channel (BCH) for transmission of system information, a Paging Channel (PCH) for transmission of paging messages, and a downlink Shared Channel (SCH) for transmission of user traffic or control messages. Traffic or control messages of a downlink multicast or broadcast service may be transmitted through a downlink SCH and may also be transmitted through a downlink multicast channel (MCH).

Uplink transport channels for transmission of data from the UE to the network include a Random Access Channel (RACH) for transmission of initial control messages and an uplink SCH for transmission of user traffic or control messages. Logical channels, which are located above the transport channels and are mapped to the transport channels, include a Broadcast Control Channel (BCCH), a Paging Control Channel (PCCH), a Common Control Channel (CCCH), a Multicast Control Channel (MCCH), and a Multicast Traffic Channel (MTCH).

Figure 4:
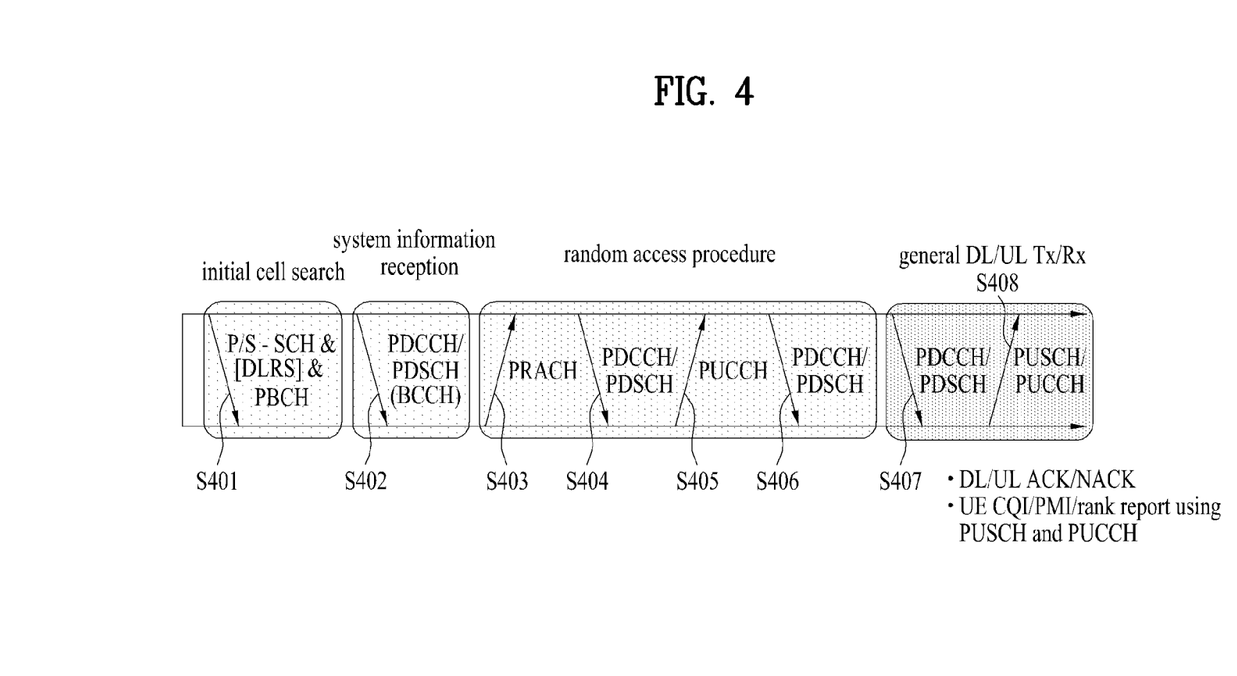
FIG. 4 is a diagram showing physical channels used in a 3GPP system and a general signal transmission method using the same.

FIG. 4 is a diagram showing physical channels used in a 3GPP system and a general signal transmission method using the same.

A UE performs an initial cell search operation such as synchronization with an eNB when power is turned on or the UE enters a new cell (S401). The UE may receive a Primary Synchronization Channel (P-SCH) and a Secondary Synchronization Channel (S-SCH) from the eNB, perform synchronization with the eNB, and acquire information such as a cell ID. Thereafter, the UE may receive a physical broadcast channel from the eNB so as to acquire broadcast information within the cell. Meanwhile, the UE may receive a Downlink Reference Signal (DL RS) so as to confirm a downlink channel state in the initial cell search step.

The UE which has completed the initial cell search may receive a Physical Downlink Control Channel (PDCCH) and a Physical Downlink Shared Channel (PDSCH) according to information included in the PDCCH so as to acquire more detailed system information (S402).

Meanwhile, if the eNB is initially accessed or radio resources for signal transmission are not present, the UE may perform a Random Access Procedure (RACH) (step S403 to S406) with respect to the eNB. In this case, the UE may transmit a specific sequence through a Physical Random Access Channel (PRACH) as a preamble (S403), and receive a response message to the preamble through the PDCCH and the PDSCH corresponding thereto (S404). In case of contention based RACH, a contention resolution procedure may be further performed.

The UE which has performed the above procedures may perform PDCCH/PDSCH reception (S407) and Physical Uplink Shared Channel PUSCH)/Physical Uplink Control Channel (PUCCH) transmission (S408) as a general uplink/downlink signal transmission procedure. In particular, the UE receives downlink control information (DCI) via a PDCCH. The DCI includes control information such as resource allocation information of the UE and the format thereof is changed according to use purpose.

The control information transmitted from the UE to the eNB in uplink or transmitted from the eNB to the UE in downlink includes a downlink/uplink ACK/NACK signal, a Channel Quality Indicator (CQI), a Precoding Matrix Index (PMI), a Rank Indicator (RI), and the like. In case of the 3GPP LTE system, the UE may transmit the control information such as CQI/PMI/RI through the PUSCH and/or the PUCCH.

Figure 5:
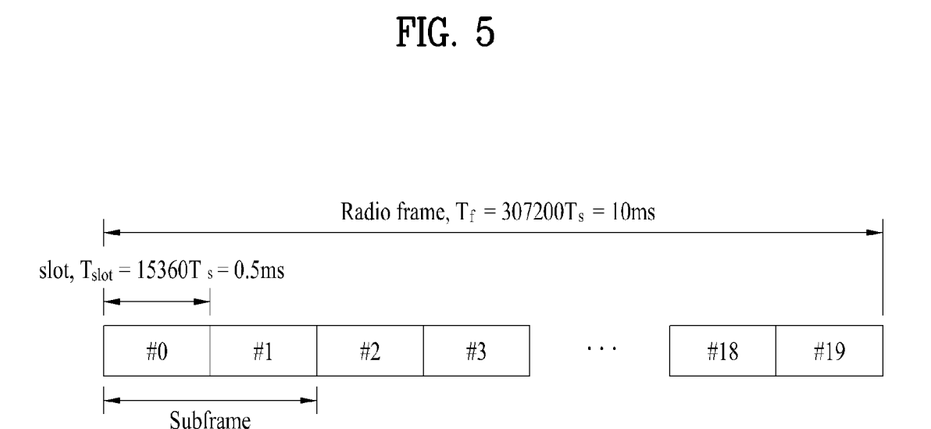
FIG. 5 is a diagram showing the structure of a radio frame used in a Long Term Evolution (LTE) system.

FIG. 5 is a diagram showing the structure of a radio frame used in a Long Term Evolution (LTE) system.

Referring to FIG. 5, the radio frame has a length of 10 ms ($327200 \times T_s$) and includes 10 subframes with the same size. Each subframe has a length of 1 ms and includes two slots. Each slot has a length of 0.5 ms ($15360 \times T_s$). $T_s$ denotes a sampling time, and is represented by $T_s=1/(15\ \text{kHz} \times 2048)= 3.2552 \times 10^{-8}$ (about 33 ns). Each slot includes a plurality of OFDM symbols in a time domain, and includes a plurality of resource blocks (RBs) in a frequency domain. In the LTE system, one RB includes 12 subcarriers×7(6) OFDM or SC-FDMA symbols. A Transmission Time Interval (TTI) which is a unit time for transmission of data may be determined in units of one or more subframes. The structure of the radio frame is only exemplary and the number of subframes included in the radio frame, the number of slots included in the subframe, or the number of OFDM symbols included in the slot may be variously changed.

Hereinafter, an RRC state of a UE and an RRC connection method will be described.

The RRC state, which indicates whether the RRC layer of the UE is logically connected to the RRC layer of the E-UTRAN, is called an RRC_CONNECTED state if the RRC layers are connected and is called an RRC_IDLE state if the RRC layers are not connected.

Since the E-UTRAN detects presence of a UE in an RRC_CONNECTED state in cell units, it is possible to efficiently control the UE. In contrast, the E-UTRAN cannot detect a UE in an RRC_IDLE state in cell units and a core network (CN) manages the UE in an RRC_IDLE state in units of TA which is greater than a cell. That is, the UE in the RRC_IDLE state transitions to the RRC_CONNECTED state in order to receive a service such as voice or data from a cell.

In particular, when a user first turns a UE on, the UE searches for an appropriate cell and then camps on an RRC_IDLE state in the cell. The UE in the RRC_IDLE state performs an RRC connection establishment process with the RRC layer of the E-UTRAN to transition to the RRC_CONNECTED state when RRC connection needs to be established. The RRC connection needs to be established when uplink data transmission is necessary due to call connection attempt of a user, when a response message is transmitted in response to a paging message received from the E-UTRAN, etc.

Figure 6:
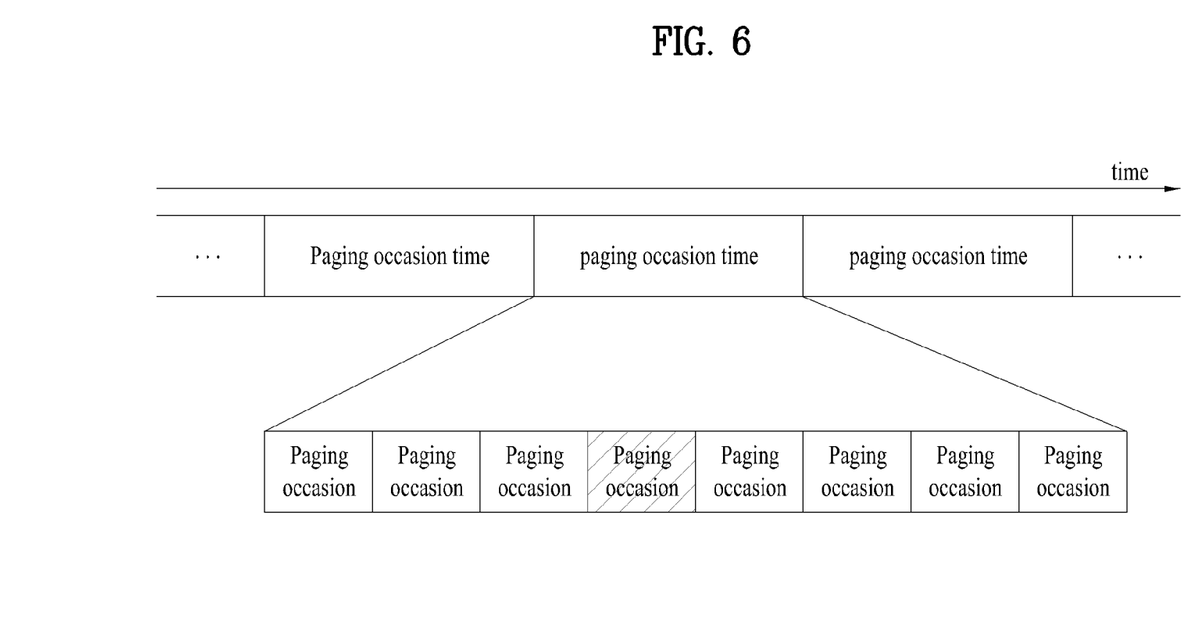
FIG. 6 illustrates a typical transmitting and receiving method using a paging message.

FIG. 6 illustrates a typical transmitting and receiving method using a paging message.

Referring to FIG. 6, the paging message includes a paging record configured by a paging cause and a UE identity. Upon receiving the paging message, the user equipment may perform Discontinuous Reception (DRX) to reduce power consumption.

Specifically, the network configures several paging occasions (POs) every time period called a paging DRX cycle. Specific user equipment may only receive specific paging occasions to obtain paging messages. The user equipment may not receive a paging channel at times other than the specific paging occasions and may be in a sleep state to reduce power consumption. One paging occasion corresponds to one TTI.

The base station and user equipment use a paging indicator (PI) as a specific value to inform the transmission of the paging message. The base station may define a specific identifier (e.g., Paging-Radio Network Temporary Identity; P-RNTI) as the PI to inform the user equipment of the paging information transmission. In one example, the user equipment wakes up every DRX cycle and receives one subframe to inform whether the paging message has appeared. When the P-RNTI is present in the L1/L2 control channel (PDCCH) of the received subframe, the user equipment may know that there is the paging message in the PDSCH of the corresponding subframe. Further, when the paging message has its own user equipment identifier (e.g., IMSI), the user equipment may respond (for example, receiving RRC connection or system information) to be serviced by the base station.

The following is a description of the system information. The system information contains the necessary information that the user equipment needs to know in order to access the base station. Therefore, the user equipment must receive all the system information before connecting to the base station. The UE should also always have up-to-date system information. Further, since the system information is information that all user equipment in a cell should know, the base station transmits the system information periodically.

The system information may be divided into MIB, SB and SIB. The MIB also allows the user equipment to know the physical configuration of the cell, for example, Bandwidth of the cell. The SB informs the UE of the transmission information of the SIBs, for example, the transmission period. The SIB may be a collection of related system information. For example, a specific SIB may contain only the information about neighboring cells, while other SIBs may only contain information on the uplink radio channel used by the user equipment.

Cell selection and cell reselection processes are illustrated below.

When the user equipment is powered on, the user equipment must select the appropriate quality cell and perform preparatory procedures to receive the service. The user equipment in the RRC idle mode should always be able to select the appropriate quality cell and prepare to receive the service via the selected cell. For example, a powered-on user equipment must select a cell of the appropriate quality to register with the network. When the user equipment in the RRC connected mode enters the RRC idle mode, this user equipment shall select a cell where the UE may stay in the RRC idle mode. Thus, a process of selecting, by the UE, a cell satisfying a specific condition in order for the user equipment to remain in a service standby mode such as the RRC idle mode may be called a cell selection. Importantly, the cell selection is performed in a state in which the user equipment has not yet determined the cell where the UE remains in the RRC idle mode. Thus, it is important for the UE to select the cell as quickly as possible. Therefore, when a specific cell provides a radio signal quality above a certain quality level, this specific cell may be selected in the cell selection process by the user equipment although this specific cell does not provide the best radio signal quality to the user equipment.

When the user equipment chooses a cell that satisfies the cell selection criterion, the user equipment receives the information necessary for operation in the RRC idle mode of the user equipment in the corresponding cell from the system information of the corresponding cell. After the user equipment receives all the necessary information for operation in the RRC idle mode, the UE waits in RRC idle mode to request the service toward the network or to receive the service from the network.

Once the user equipment selects the cell via the cell selection process, the strength or quality of a signal between the user equipment and the base station may change due to mobility of the user equipment or changes in the radio environment. Therefore, if the quality of the selected cell deteriorates, the user equipment may select another cell that provides better quality. When the cell is selected again, generally, a cell that provides better signal quality than the currently selected cell is selected. This process is called a cell reselection. The cell reselection process has a basic purpose to select a cell that provides the best quality for user equipment in terms of the quality of the radio signal. With consideration of other factors than the quality of the radio signal, the network may determine a frequency-based priority and inform the user equipment of the determined frequency-based priority. Up receiving this priority, the UE preferentially takes the priority over the radio signal quality criteria in the cell reselection process.

Figure 7:
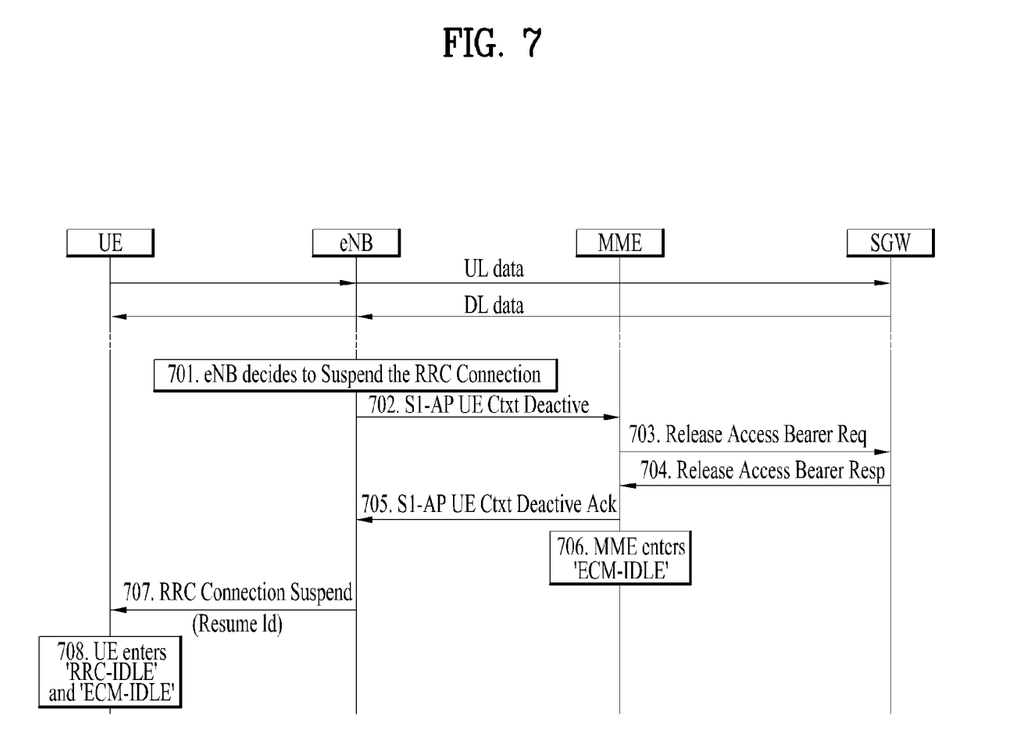
FIG. 7 is a diagram illustrating the RRC connection suspending procedure in the LTE system.

FIG. 7 is a diagram illustrating the RRC connection suspending procedure in the LTE system.

Referring to FIG. 7, while performing a general communication procedure such as uplink data communication and downlink data communication, the eNB decides in operation 701 to suspend the RRC connection with the UE. In operation 702 to operation 706, the eNB prepares the RRC connection suspending procedure with the MME and the SGW.

The eNB then sends an RRC connection suspending message to the UE in operation 707. In particular, the RRC connection suspending message may include a RRC connection resume identification (Resume ID). After receiving the RRC connection suspending message, the UE transitions to the RRC idle state and the ECM_IDLE state in operation 708.

Figure 8:
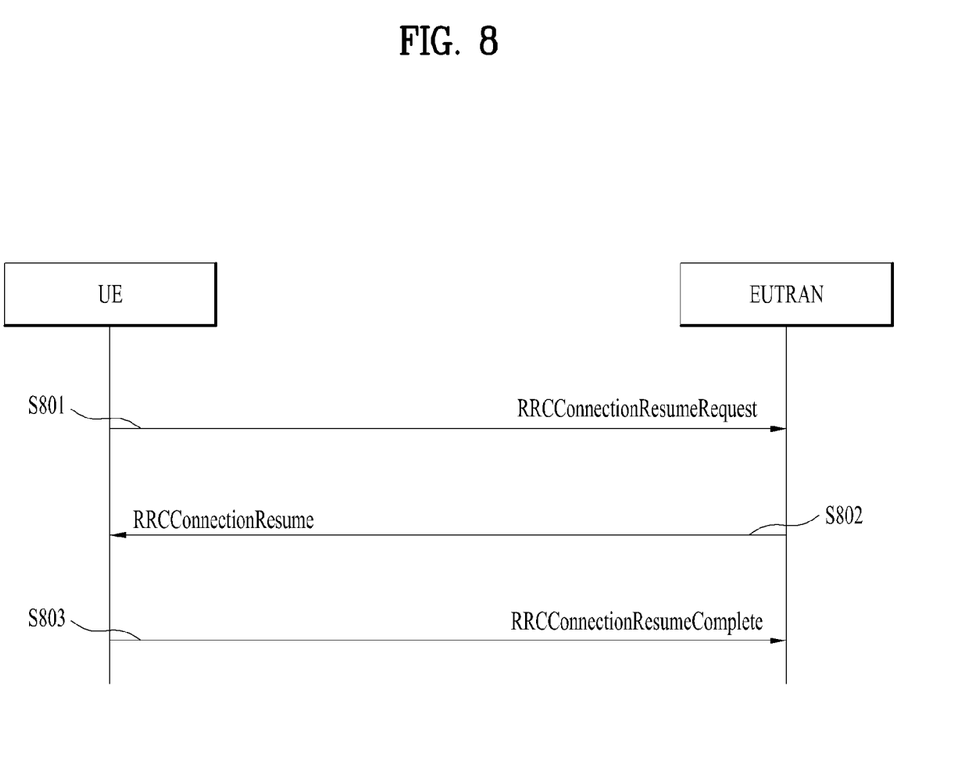
FIG. 8 shows an example of performing the RRC connection resumption procedure in the LTE system.

FIG. 8 shows an example of performing the RRC connection resume procedure in the LTE system.

Referring to FIG. 8, in operation 801, the UE transmits an RRC connection resuming request message to the network, In operation 802, a RRC connection resume message is received from the network in response to the RRC connection resume request message. In this case, the RRC connection resume request message and the RRC connection resume message may include the resume ID mentioned in FIG. 7 instead of the UE ID.

Finally, the UE resumes the RRC connection with the network and transmits an RRC connection resume completion message to the network, and ends the RRC connection resume procedure. Although not shown in FIG. 8, when an RRC connection resume rejection message is received from the network in response to the RRC connection resume request message, the UE discards the existing RRC connection. Rather, a RRC connection procedure with the network must be newly started by the UE.

Meanwhile, various optimization schemes are discussed to reduce the paging signaling overhead in LTE systems. One paging optimization method is configured such that the MME recognizes the last cell connected to the UE before the UE becomes the idle state. Assuming that the mobility of the UE is limited, the paging from the MME to the cell may be initially transmitted to the cell in the idle state. When there is no response from the idle state cell, the paging range is extended to several cells. As a result, the entire region may be included in the paging range.

The present disclosure proposes an approach to reduce the paging signaling overhead. In this approach, whether the eNB is storing an UE context is used. First, the eNB stores the context of the UE in the idle state. When the UE moves to another new eNB, the UE reports, to the new eNB, information informing the movement from the previous eNB. Storing this information may allow the new eNB may determine whether to transmit the paging signal to the cell region. If no UE ID pre-stored by the eNB is not present in the paging message received from the MME, the eNB does not transmit the paging message to the corresponding cell region.

More specifically, the MME transmits a paging message to all eNBs. The MME transmits an indicator indicating whether the paging message is intended for the eNB storing the UE context, together with the corresponding paging message. Upon receiving the paging message from the MME, the eNB preferentially checks the indicator. That is, when the paging message is intended for the eNB storing the UE context, the eNB determines whether the message stores the UE context. Then, the eNB determines whether to transmit the paging message into the cell region based on the determination result.

When no response is transmitted from the UE to the MME via the eNB, the MME passes the paging message back to all eNBs. Then, each eNB transmits the paging message to the cell region. In this regard, the indicator indicating whether the paging message is intended for the eNB storing the UE context may be included in the paging message transmitted back to each eNB from the MME.

In one example, when the UE transitions to an idle state, the UE reports information to the MME indicating the transition to the idle state. Thus, the MME may recognize the last cell where the UE transitions to the idle state. However, when the corresponding UE in the idle state moves to an adjacent eNB, the corresponding UE reports information only to the eNB informing the movement to the adjacent eNB, but this information is not reported from the UE to the MME. Thus, the MME cannot recognize the movement information of the corresponding UE. On the other hand, the new eNB may receive the UE context from the previous eNB.

Additionally, preferably, when the eNB is storing the context of the paged UE, the eNB records an indicator of a 1 bit size in the paging record informing such storage and transmits the paging message to the cell region.

In one example, depending on the type of paging message and whether the UE context is stored, whether to perform a random access procedure (RA) performed by a UE in an idle state may also be changed. When the paging message is a first-transmitted paging message, that is, a paging message transmitted by an eNB storing the UE context, the UE performs the RRC connection resume procedure rather than the RA procedure. On the other hand, when the paging message is a second transmitted paging message, i.e., a paging message transmitted by the eNB that does not store the UE context, the UE discards the stored context information and performs the RA procedure usually. That is, the RRC connection procedure is performed.

Figure 9:
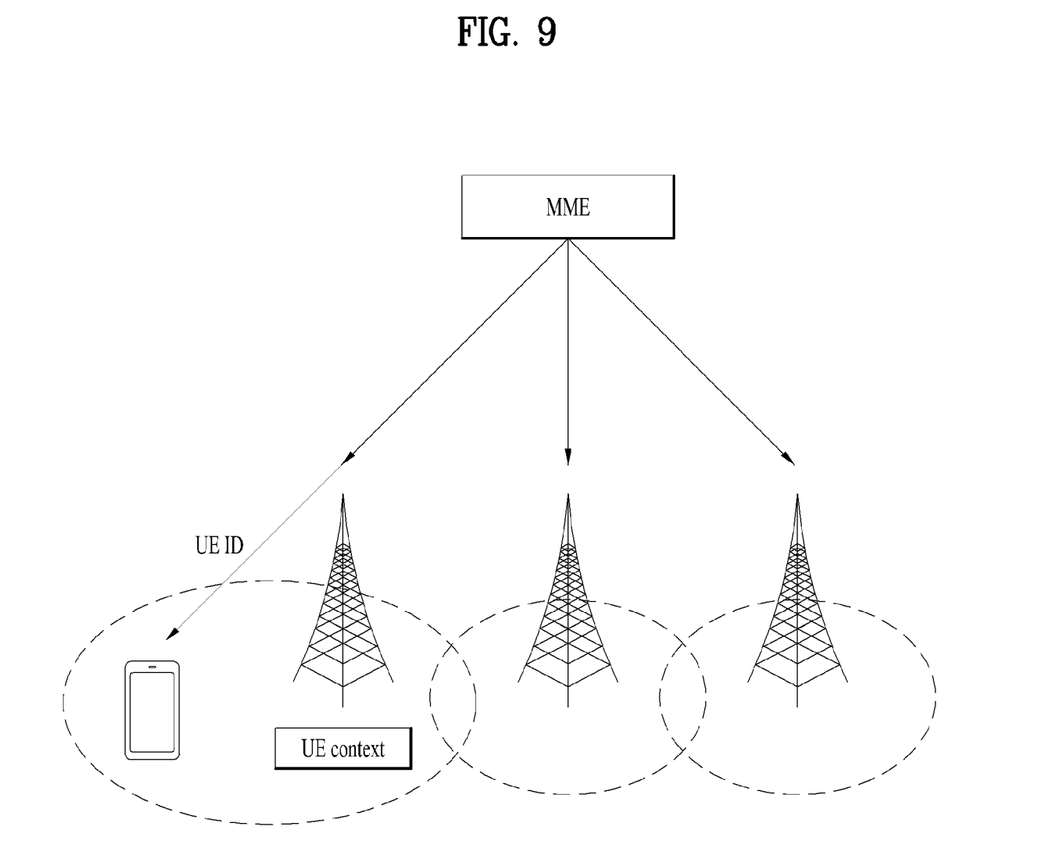
FIG. 9 and FIG. 10 show a transmission process of a paging message according to an embodiment of the present disclosure.
Figure 10:
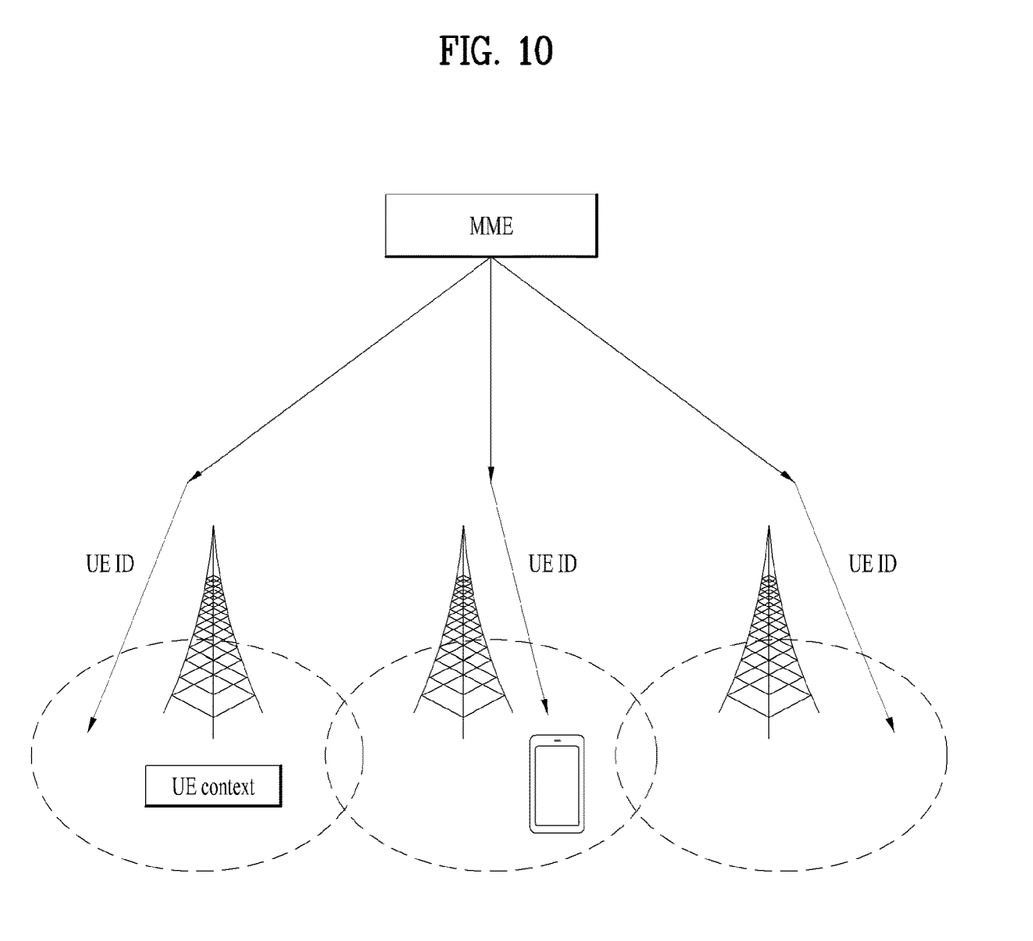

The features of the present disclosure as described above will be illustrated with reference to the drawings FIG. 9 and FIG. 10 show the paging message transmission process according to an embodiment of the present disclosure.

First, referring to FIG. 9, the MME transmits a paging message to all eNBs. It may be assumed that the paging message includes an indication that the message is intended for an eNB storing the UE context. In such a case, only the eNB storing the UE context transmits the corresponding paging message to the cell region. Preferably, an indicator indicating that the eNB is storing the UE context may be included in the paging message.

When there is a UE in the RRC connection suspended state in the corresponding cell region as shown in FIG. 9, the UE checks an indicator indicating that the eNB is storing the UE context in the corresponding paging message. Then, the UE transmits an RRC connection resume request message to the eNB.

However, as shown in FIG. 10, when the UE in the RRC connection suspended state moves to the neighboring eNB, the response to the paging message may not be transmitted to the MME. Therefore, the MME passes the paging message back to all the eNBs. Each eNB transmits the paging message to the cell region. In this regard, an indicator may be included in the paging message to inform that the paging message transmitted from the MME to each eNB is intended for the eNB storing the UE context. Further, the eNB may add information indicating that the eNB does not store the UE context in the paging message to be transmitted to the cell region.

Then, as shown in FIG. 10, the UE checks the information that the UE context is not stored via a corresponding paging message. Then, the UE discards the existing UE context and transmits an RRC connection request message to the eNB.

Figure 11:
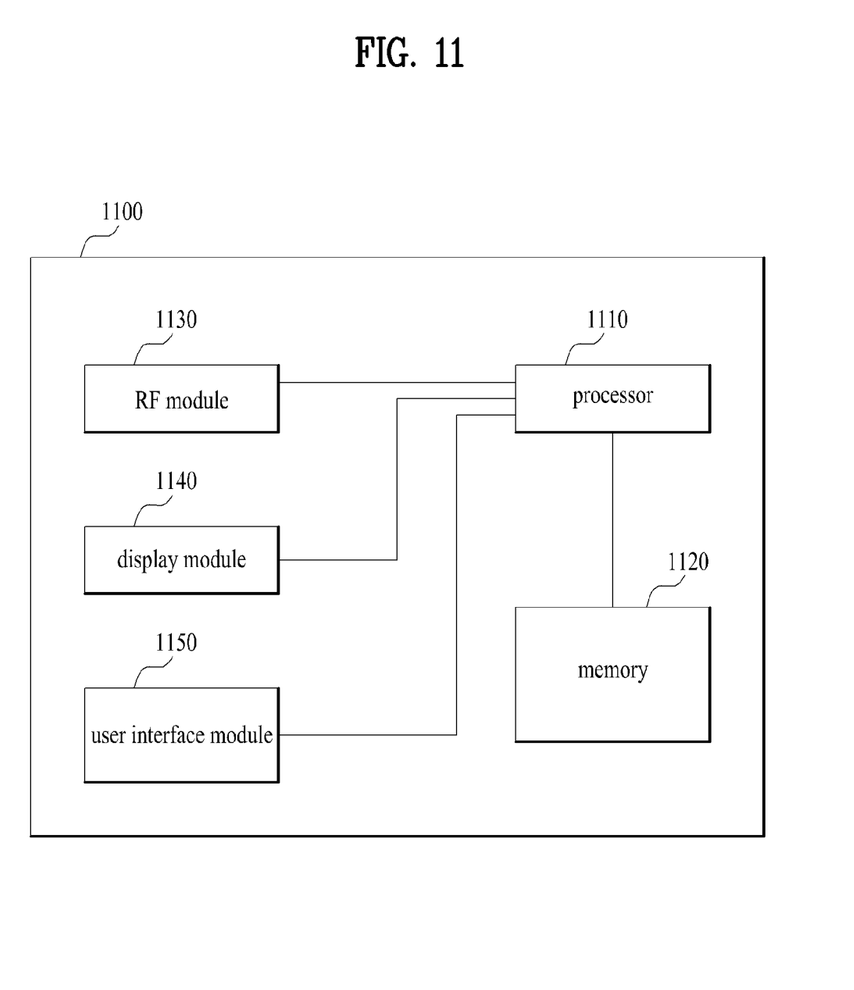
FIG. 11 is a block diagram of a communication apparatus according to an embodiment of the present disclosure.

FIG. 11 is a block diagram illustrating a communication apparatus in accordance with an embodiment of the present disclosure.

Referring to FIG. 11, a communication device 1100 includes a processor 1110, a memory 1120, a Radio Frequency (RF) module 1130, a display module 1140, and a user interface module 1150.

The communication device 1100 is illustrated for convenience of the description and some modules may be omitted. Moreover, the communication device 1100 may further include necessary modules. Some modules of the communication device 1100 may be further divided into sub-modules. The processor 1110 is configured to perform operations according to the embodiments of the present disclosure exemplarily described with reference to the figures. Specifically, for the detailed operations of the processor 1110, reference may be made to the contents described with reference to FIGS. 1 to 10.

The memory 1120 is connected to the processor 1110 and stores operating systems, applications, program code, data, and the like. The RF module 1130 is connected to the processor 1110 and performs a function of converting a baseband signal into a radio signal or converting a radio signal into a baseband signal. For this, the RF module 1130 performs analog conversion, amplification, filtering, and frequency upconversion or inverse processes thereof. The display module 1140 is connected to the processor 1110 and displays various types of information. The display module 1140 may include, but is not limited to, a well-known element such as a Liquid Crystal Display (LCD), a Light Emitting Diode (LED), or an Organic Light Emitting Diode (OLED). The user interface module 1150 is connected to the processor 1110 and may include a combination of well-known user interfaces such as a keypad and a touchscreen.

The above-described embodiments are combinations of elements and features of the present disclosure in a predetermined manner. Each of the elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions of any one embodiment may be included in another embodiment and may be replaced with corresponding constructions of another embodiment. In the appended claims, it will be apparent that claims that are not explicitly dependent on each other can be combined to provide an embodiment or new claims can be added through amendment after the application is filed.

The embodiments according to the present disclosure can be implemented by various means, for example, hardware, firmware, software, or combinations thereof. In the case of a hardware configuration, the embodiments of the present disclosure may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In the case of a firmware or software configuration, the method according to the embodiments of the present disclosure may be implemented by a type of a module, a procedure, or a function, which performs functions or operations described above. For example, software code may be stored in a memory unit and then may be executed by a processor. The memory unit may be located inside or outside the processor to transmit and receive data to and from the processor through various well-known means.

The present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents and all changes coming within the meaning and equivalency range of the appended claims are intended to be embraced therein.

INDUSTRIAL APPLICABILITY

Although an example in which the method of receiving the paging signal by the user equipment in a wireless communication system as described above and the device for performing the above method are applied to the 3GPP LTE system has been illustrated, the method and device may be applied to various wireless communication systems other than the 3GPP LTE system.

The invention claimed is:

1. A method for receiving a paging message, by a user equipment (UE) in a radio resource control (RRC) connection suspended state, in a wireless communication system, the method comprising:
receiving the paging message from an evolved Node B (eNB);
checking an indicator indicating whether the eNB stores a UE context, wherein the indicator is included in the paging message;
when the indicator indicates that the UE context is stored in the eNB, transmitting an RRC connection-resume request message to the eNB; and
when the indicator indicates that the UE context is not stored in the eNB, performing a random access (RA) procedure related to the eNB and discarding a UE context stored in the UE.

2. The method of claim 1,
wherein the paging message is transmitted from a mobility management entity (MME) to the eNB, and
wherein the paging message transmitted to the eNB includes information indicating that the paging message is intended for the eNB storing the UE context therein.

3. A method for transmitting, by an evolved Node B (eNB), a paging message to a user equipment (UE) in a radio resource control (RRC) connection suspended state, in a wireless communication system, the method comprising:
receiving the paging message from a mobility management entity (MME);
transmitting the paging message to the UE, the paging message including an indicator indicating whether the eNB stores a UE context,
when the indicator indicates that the UE context is stored in the eNB, receiving, from the UE, an RRC connection-resume request message; and
when the indicator indicates that the UE context is not stored in the eNB, performing a random access (RA) procedure related to the UE,
wherein when the indicator indicates that the UE context is not stored in the eNB, the UE context stored in the UE is discarded.

4. The method of claim 3, wherein the paging message received from the MME includes information indicating that the paging message is intended for the eNB storing the UE context therein.

* * * * *